March 30, 1943.  F. D. SWEENEY  2,314,907
FISHING LURE
Filed July 26, 1941
Fig. 1.
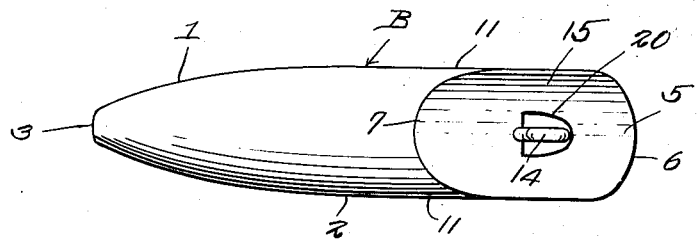
Fig. 2.
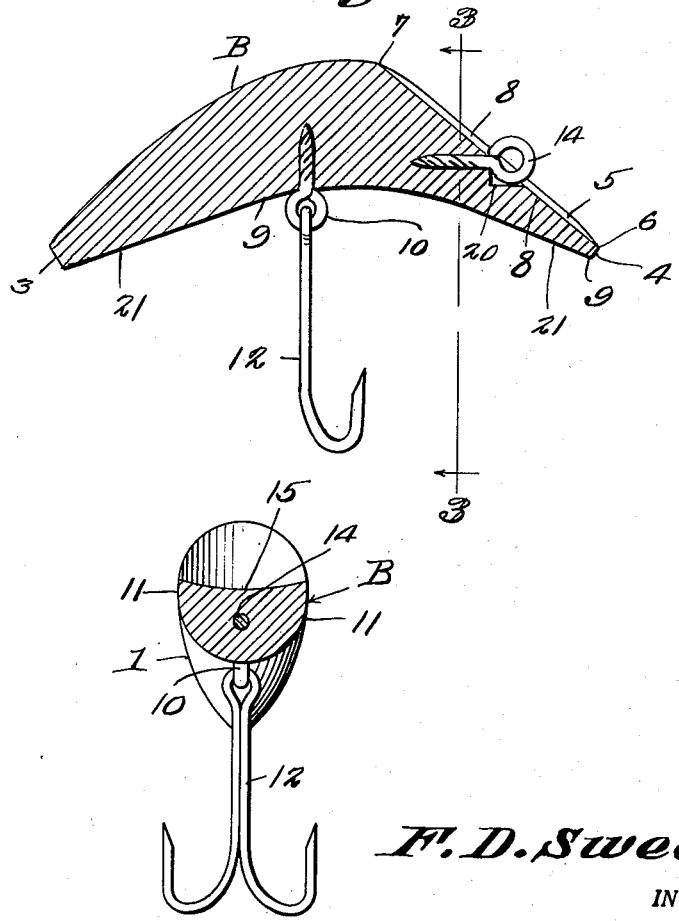
Fig. 3.
F. D. Sweeney
INVENTOR.
BY Patented Mar. 30, 1943

2,314,907

UNITED STATES PATENT OFFICE 2,314,907

FISHING LURE

Floyd D. Sweeney, Fresno, Calif.

Application July 26, 1941, Serial No. 404,227

1 Claim. (Cl. 43—46)

The device forming the subject matter of this application is a fishing lure of small size, and intended to be used with a light rod, for casting of a nature that resembles fly casting. The drawing shows the device about three times its natural size. Considering the smallness of the lure, and that casting resembling fly casting is a procedure entirely different from rough bait casting, the lure must have characteristic features which, taken in combination, enable it to be satisfactory for the purpose in view, both as to the casting operation and the landing of the lure on the water, as well as the towing operation.

This invention aims to provide a fishing lure not broadly new, superficially considered, but having, nevertheless, structural features which cooperate to secure desirable results, especially in view of the fact that the device is not intended to be used for rough-handed casting.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing, the device is shown much enlarged beyond its actual dimensions, and in the drawing:

Fig. 1 shows in top plan, a lure constructed in accordance with the invention;

Fig. 2 is a longitudinal section wherein parts remain in elevation;

Fig. 3 is a cross section on the line 3—3 of Fig. 1.

The fishing lure forming the subject matter of this application comprises a body B, made of any material suitable for the purpose in view, and colored or decorated as desired. The body B is of approximately circular cross section, and is tapered, as shown at 1, from a place 2 approximately midway between its ends, to its rear end.

The body B has a flat rear end surface 3, and a lower, forward surface 4 having a downward and rearward slant. The body B is provided with an upper, forward surface 5, extended from the upper edge 6 of the lower, forward end surface 4, to a place 7 a little less than half the length of the body, measured from front to rear. The aforesaid surface 5 has a downward and forward slant, as shown at 8, throughout its length, and is transversely concaved, as indicated at 15, throughout its length. The transverse concavity indicated at 15 is formed on a radius so long that the concavity extends through an arc materially less than 180 degrees. There is a minimum amount of disturbance at the time the cast is completed, and there is no pocketing of water and a corresponding disturbance, when tension is put on the towing line. A depression 20 is formed in the surface 5.

The lower edge 9 of the body B has straight, obtusely disposed end portions 21 connected by a continuous upward curve 9.

A fish hook support 10 is mounted on the lower surface of the body and is disposed slightly to the rear of the rear edge 7 of the upper, forward surface 5 and midway between the sides 11 of the body. A hook 12 is mounted to swing on the hook support 10. The hook support 10 is disposed slightly to the rear of a point midway between the ends of the body B, to offset the weight of the casting line connection 14 next to be described.

A tow line connection 14, such as a screw eye, is located on the upper forward surface 5, midway between the sides 11 of the body B, and nearer to the lower end of that surface than to the upper end thereof. The tow line connection 14 may be a screw eye, having its head partly disposed in the depression 20, and its shank threaded into the body B.

Considering the small size of the body B, the method of casting, the way in which the lure lands on the surface of the water, and the way in which the lure must be manipulated after it reaches the water, the specific construction hereinbefore outlined is of importance.

The structure disclosed in this application is simple, but will be found thoroughly advantageous to consummate the objects set forth in the opening portion of this document.

Having thus described the invention, what is claimed is:

A fishing lure comprising a body of approximately circular cross section, and tapered rearwardly from a place approximately midway between its ends, the body having a flat rear end surface, and a lower, forward surface, which converge downwardly, the body being provided with an upper, forward surface extended from the upper edge of the lower forward end surface to a place a little less than half the length of the body, measured from front to rear, the upper, forward surface having a downward and forward slant throughout its length, and being transversely concaved throughout its length on a radius so long that the concavity extends through materially less than 180 degrees of arc, the lower edge of the body comprising an intermediate upward curve and straight, obtusely disposed portions extended, respectively, from the ends of the intermediate curve to the lower ends of the rear end surface and the lower, forward surface, a single fish hook support on the lower surface of the body and disposed slightly to the rear of the rear edge of the upper, forward surface and midway between the sides of the body, a hook mounted to swing on the hook support, and a casting line connection located on the upper, forward surface, midway between the sides of the body and nearer to the lower end of that surface than to the upper end thereof, the hook support being disposed slightly to the rear of a point midway between the ends of the body, to offset the weight of the casting line connection.

FLOYD D. SWEENEY.